US012126275B2

(12) United States Patent
Durst et al.

(10) Patent No.: US 12,126,275 B2
(45) Date of Patent: Oct. 22, 2024

(54) MONITORING UNIT FOR AN INVERTER

(71) Applicant: Fronius International GmbH, Pettenbach (AT)

(72) Inventors: Florian Durst, Wels-Thalheim (AT); Gerhard Wallisch, Wels-Thalheim (AT); Bernhard Staudinger, Wels-Thalheim (AT); Daniel Chalupar, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 281 days.

(21) Appl. No.: 17/912,693

(22) PCT Filed: Mar. 19, 2021

(86) PCT No.: PCT/EP2021/057109
§ 371 (c)(1),
(2) Date: Sep. 19, 2022

(87) PCT Pub. No.: WO2021/186043
PCT Pub. Date: Sep. 23, 2021

(65) Prior Publication Data
US 2023/0216395 A1 Jul. 6, 2023

(30) Foreign Application Priority Data
Mar. 20, 2020 (EP) .................. 20164548

(51) Int. Cl.
*H02M 7/487* (2007.01)
*H02M 1/00* (2006.01)
*H02M 1/32* (2007.01)

(52) U.S. Cl.
CPC ......... *H02M 7/487* (2013.01); *H02M 1/0012* (2021.05); *H02M 1/32* (2013.01)

(58) Field of Classification Search
CPC ...... H02M 1/32; H02M 1/0012; H02M 7/487; Y02E 10/56
See application file for complete search history.

(56) References Cited

U.S. PATENT DOCUMENTS 5,182,701 A * 1/1993 Mochikawa ...... H02M 7/53875
363/95
6,058,031 A * 5/2000 Lyons .................. H02M 7/487
363/67

(Continued)

FOREIGN PATENT DOCUMENTS

| EP | 3 193 441 | 7/2017 |
| EP | 3 331 142 | 6/2018 |
| WO | 2013/102779 | 7/2013 |

OTHER PUBLICATIONS

Pols Van Der E K H et al., "Design and Implementation of a Pulse Width Modulator for a Three-Level Inverter Using a Microprocessor and EPLDS", *Control in Power Electronics*. Brighton, Sep. 13-16, 1993; [Proceedings of The European Conference on Power Electronics and Applications London, IEE, GB, vol. 4, XP000427065, Sep. 13, 1993, pp. 146-151.

(Continued)

*Primary Examiner* — Yusef A Ahmed
(74) *Attorney, Agent, or Firm* — GREENBLUM & BERNSTEIN, P.L.C.

(57) ABSTRACT

In order to protect an inverter from prohibited switching states, a monitor including monitoring inputs and monitoring outputs is provided. The monitoring inputs are connected to the control outputs in order to receive the switching patterns, and the monitoring outputs are connected to the power switches. The monitor is designed to compare a transition from a first switching pattern to a second switching pattern with a number of prohibited transitions and/or with a number of permitted transitions and block the second (Continued)

switching pattern in the event of a match with one of the prohibited transitions and/or in the event of a deviation from the number of permitted transitions and to output the second switching pattern to the power switches via the monitoring outputs in the event of a deviation from the number of prohibited transitions and/or in the event of a match with one of the permitted transitions.

11 Claims, 9 Drawing Sheets

(56) References Cited

U.S. PATENT DOCUMENTS

| | | | | |
|---|---|---|---|---|
| 6,967,454 | B1* | 11/2005 | Braun | H02P 29/02 318/563 |
| 7,102,321 | B2* | 9/2006 | Edwards | H02M 7/487 318/400.26 |
| 9,102,242 | B2* | 8/2015 | Hauenstein | B60L 15/20 |
| 11,581,820 | B1* | 2/2023 | Mekonnen | H02M 7/4835 |
| 2006/0044711 | A1* | 3/2006 | Wiseman | H02P 29/0241 361/23 |
| 2006/0197491 | A1* | 9/2006 | Nojima | H02M 7/487 318/801 |
| 2006/0245216 | A1* | 11/2006 | Wu | H02M 7/4833 363/13 |
| 2011/0141779 | A1* | 6/2011 | Joseph | H02M 7/487 363/95 |
| 2012/0300514 | A1* | 11/2012 | Kolar | H02J 3/1857 363/39 |
| 2015/0023080 | A1* | 1/2015 | Chambon | H02M 7/4837 327/108 |
| 2015/0155796 | A1* | 6/2015 | Hsieh | H02M 1/32 363/131 |
| 2018/0019684 | A1* | 1/2018 | Yamashita | H02M 7/4833 |
| 2018/0076744 | A1* | 3/2018 | Wolf | H02P 6/10 |
| 2018/0153519 | A1 | 6/2018 | Cho et al. | |
| 2018/0287601 | A1* | 10/2018 | Yang | H03K 17/041 |
| 2020/0304049 | A1* | 9/2020 | Li | H02M 7/5395 |
| 2020/0350847 | A1* | 11/2020 | Geyer | H02P 27/12 |
| 2023/0353039 | A1* | 11/2023 | Chaudhari | H02M 7/487 |
| 2023/0387838 | A1* | 11/2023 | Oakham | H02P 6/182 |

OTHER PUBLICATIONS

Papafotiou G et al., "Model Predictive Direct Torque Control-Part II: Implementation and Experimental Evaluation", *IEEE Transactions on Industrial Electronics*, IEEE Service Center, Piscataway, NJ, USA, vol. 56, No. 6, ISSN: 0278-0046, XP011248688, Jun. 1, 2009, pp. 1906-1915.

Kollensperger P et al., "Design of a Flexible Control Platform for Soft-Switching Multi-Level Inverters", Power Electronics Specialists Conference, 2005. PESC '05. IEEE 36th. IEEE, Piscataway, NJ, USA, DOI: 10.1109/PESC.2005.1581737, ISBN: 978-0-7803-9033-1. XP010883319, Jun. 12, 2005, pp. 915-921.

Sapin A et al., "Modeling, simulation and test of a three-level voltage source inverter with output LC filter and direct torque control", *IEEE*, US, vol. 1, Oct. 12, 2003, DOI: 10.1109/IAS.2003.1257545, ISBN: 978-0-7803-7883-4. XP010676065, pp. 492-498.

Int'l Search Report (Form PCT/ISA/210) conducted in Int'l Appln. No. PCT/EP2021/057109 (Apr. 28, 2021).

Int'l Written Opinion (Form PCT/ISA/237) conducted in Int'l Appln. No. PCT/EP2021/057109 (Apr. 28, 2021).

Int'l Prelim. Exam. Report (Form PCT/IPEA/409) conducted in Int'l Appln. No. PCT/EP2021/057109 (Jun. 10, 2022).

* cited by examiner

MONITORING UNIT FOR AN INVERTER

The present invention relates to an inverter for converting an input DC voltage into at least one output AC voltage, comprising a number of power switches and comprising a control unit which is designed to output switching patterns for the power switches via control outputs. Furthermore, the present invention relates to a method for operating an inverter comprising a number of power switches, a control unit outputting switching patterns for the power switches in order to convert an input DC voltage into at least one output AC voltage.

An inverter is also referred to as a converter and constitutes a DC/AC converter. This means that an inverter converts an input DC voltage into an output AC voltage. In this case, a DC voltage source, for example a photovoltaic system in generator mode, is provided at an input and supplies the input DC voltage. A DC-DC converter may also be connected between the photovoltaic system and the input of the inverter in order to operate the PV system at the optimum operating point. The input DC voltage is applied to a bridge input side of the DC/AC voltage bridge. A capacitive intermediate circuit, to which the input DC voltage is likewise applied, may also be provided at the input of the inverter. The output AC voltage is applied to a bridge output side of the DC/AC voltage bridge (which thus represents the output of the inverter) and may also be provided to an AC voltage network. In addition, clock filters and/or mains filters may be provided at the output of the inverter. The inverter may also be designed to be bidirectional, which means that an output AC voltage can also be converted into an input DC voltage.

If the inverter is designed as a multi-level inverter, the DC/AC voltage bridge has at least one upper half bridge and at least one lower half bridge. Each half bridge comprises at least two power switches connected via a connection point, for example IGBTs or MOSFETs, each of which is in a switching state, i.e. open or closed. The upper half bridge generates positive half waves of the output AC voltage and the lower half bridge generates negative half waves of the output AC voltage.

The inverter may comprise one or more phase branches, at least one upper and lower half bridge per phase being provided in each case in the case of a multi-phase multi-level inverter in the DC/AC voltage bridge. At the input, an NPC (neutral point clamped) inverter has an intermediate circuit which comprises two intermediate circuit capacitors connected in series via an intermediate circuit center point. The intermediate circuit center point is further connected via diodes to the connection points of the upper and lower half bridges.

A control unit is provided in the inverter. Control outputs of the control unit are connected via control lines to the power switches. The control unit always specifies the current switching state via the control outputs. The individual switching states are varied in order to generate the desired output AC voltage. The switching states of the power switches of the half bridges of one phase at a point in time are thus referred to as a switching pattern, considered as a whole. A switching pattern therefore comprises a switching state for each power switch. Thus, at any point in time, the control unit outputs a switching pattern which is forwarded via the control lines to the power switches. The power switches are in each case opened or closed in accordance with the current switching pattern at each point in time in order to generate the desired output AC voltage.

However, there are also certain prohibited switching patterns which can lead to damage to the inverter, in particular to the power switches. The prohibited switching states can be divided into destructive and potentially destructive switching patterns. Destructive switching patterns lead to damage regardless of external circumstances, whereas potentially destructive switching patterns can lead to damage when particular external circumstances arise. It is thus desirable that both destructive and potentially destructive switching patterns are avoided.

In particular, in the development phase, for example in the event of tests of the DC/AC voltage bridge of an inverter, prohibited switching patterns are extremely unpleasant. If, for example, the power switches of an upper and lower half bridge are closed simultaneously in one phase branch, i.e., switched conductively (prohibited switching pattern), energy stored in the intermediate circuit is converted into thermal energy within a very short period of time. As a result, in addition to damage to the power switches or other components, a loud bang may also arise, which can lead to permanent hearing damage.

It is therefore an object of the present invention to protect the inverter from prohibited switching states.

This object is achieved according to the invention by providing a monitoring unit comprising monitoring inputs and monitoring outputs, the monitoring inputs being connected to the control outputs in order to receive the switching patterns, and the monitoring outputs being connected to the power switches. The monitoring unit is designed to compare a transition from a first switching pattern to a second switching pattern with a number of prohibited transitions and/or with a number of permitted transitions and to block the second switching pattern in the event of a match with one of the prohibited transitions and/or in the event of a deviation from the number of permitted transitions, and to output the second switching pattern to the power switches via the monitoring outputs in the event of a deviation from the number of prohibited transitions and/or in the event of a match with one of the permitted transitions.

Furthermore, the object is achieved by a method in which a transition from a first switching pattern to a second switching pattern is compared with a number of prohibited transitions and/or a number of permitted transitions by means of a monitoring unit and independently of the control unit, the monitoring unit blocking the second switching pattern in the event that the transition matches one of the prohibited transitions and/or in the event of a deviation from the number of permitted transitions and outputting the second switching pattern to the power switches in the event that the transition deviates from the number of prohibited transitions and/or in the event of a match with one of the permitted transitions.

The transition currently output by the control unit is to be regarded as a transition. It is thus possible to check by means of the monitoring unit whether a transition from a (fundamentally permitted) first switching pattern to a (fundamentally permitted) second switching pattern corresponds to a permitted transition and/or a prohibited transition. The number of prohibited transitions and/or permitted transitions is known to the monitoring unit (for example, as a result of the topology of the inverter) and may be present as a table, for example.

The check for a deviation from the number of permitted/prohibited transitions means that the deviation from all permitted/prohibited transitions is checked. A match can logically only be present with one permitted/prohibited transition, since only one transition is output by the control unit at a time.

If the monitoring unit knows the number of prohibited transitions, a match with a permitted transition can implicitly be assumed based on a deviation of the switching pattern from all of these prohibited transitions, and therefore the second switching pattern is output to the power switches. It may therefore also be sufficient if only the number of prohibited transitions is known to the checking unit.

If the number of permitted transitions is known to the monitoring unit, a match with a prohibited transition can implicitly be assumed based on a deviation of the switching pattern from all of these permitted transitions, and therefore the second switching pattern is blocked. It may therefore be sufficient if only the number of permitted transitions is known to the checking unit.

Formulated in one sentence: If the transition does not correspond to any of the permitted transitions, the transition corresponds to one of the number of prohibited transitions, and vice versa. If the number of permitted and the number of prohibited transitions is known to the monitoring unit, the switching pattern can preferably be compared based on both permitted and prohibited transitions. Of course, the number of permitted and the number of prohibited transitions cannot overlap, i.e. a transition can be only permitted or prohibited.

The monitoring unit may be designed to output a permitted transition from the first switching pattern to at least one third switching pattern and a permitted transition from the at least one third switching pattern to the second switching pattern in the event of a match with one of the prohibited transitions and/or in the event of a deviation from the number of permitted transitions.

In the event that the transition matches one of the prohibited transitions and/or in the event of a deviation from the number of permitted transitions, a permitted transition from the first switching pattern to at least one third switching pattern and a permitted transition from the at least one third switching pattern to the second switching pattern can be output.

Thus, by way of a detour via one or more permitted transitions, it can be ensured that the second switching pattern is achieved, provided that it is fundamentally possible to achieve the second switching pattern via one or more permitted transitions. In this case, it is advantageous if the switching patterns output during these transitions are also compared with a number of permitted and/or prohibited switching patterns in order to ensure that the switching patterns output are themselves permitted, as described below.

The monitoring unit is preferably designed to compare a received switching pattern with a number of prohibited switching patterns and/or with a number of permitted switching patterns and to block the switching pattern in the event that the switching pattern matches one of the prohibited switching patterns and/or in the event that the switching pattern deviates from the number of permitted switching patterns, and to output the received switching pattern to the power switches via the monitoring outputs in the event of a deviation from the number of prohibited switching patterns and/or in the event of a match with one of the permitted switching patterns.

Furthermore, the switching patterns are preferably compared with a number of prohibited switching patterns and/or a number of permitted switching patterns by a monitoring unit independently of the control unit, and the monitoring unit blocks the switching pattern in the event that the switching pattern matches one of the prohibited switching patterns and/or a in the event of a deviation from the number of permitted switching patterns and outputs the switching pattern to the power switches in the event that the switching pattern deviates from the number of prohibited switching patterns and/or in the event of a match with one of the permitted switching patterns.

The switching pattern currently output by the control unit is to be regarded as the switching pattern. The power switches then switch according to the obtained switching patterns that are output by the monitoring unit. Since the switching patterns output by the control unit are compared with the number of prohibited/permitted switching patterns by means of a monitoring unit that is independent of the control unit, the control unit itself does not have to monitor the output switching patterns. By implementing the monitoring of the switching patterns in the monitoring unit, the resources of the control unit are conserved. As a result of the separate design, correct functioning of the monitoring unit is also easy to test and the control unit and monitoring unit can be developed independently of one another. Likewise, a control unit already present in an inverter can also be retrofitted with a monitoring unit. For this purpose, the monitoring unit only needs to be switched between the control unit and the power switch, Of course, a check for permitted and/or prohibited switching patterns may also be carried out in the control unit, but with the advantage of the resources of the control unit being conserved becoming obsolete.

The prohibited switching patterns and/or permitted switching patterns are known to the monitoring unit (for example, as a result of the topology of the inverter) and may be present as a table, for example. The check for a deviation from the number of permitted/prohibited switching patterns means that the deviation from all permitted/prohibited switching patterns is checked. A match can logically only be present with one permitted/prohibited switching pattern, since only one switching pattern is output by the control unit at a time.

If the number of prohibited switching patterns is known to the monitoring unit, a match with a permitted switching pattern can implicitly be assumed based on a deviation of the switching pattern from all of these prohibited switching patterns, which results in the switching pattern being output by the monitoring unit to the power switches. It may therefore also be sufficient if only the number of prohibited switching patterns is known to the checking unit.

If the number of permitted switching patterns is known to the monitoring unit, a match with a prohibited switching pattern can implicitly be assumed based on a deviation of the switching pattern from all of these permitted switching patterns, which results in the switching pattern being blocked by the monitoring unit. It may therefore be sufficient if only the number of permitted switching patterns is known to the checking unit.

Formulated in one sentence: If the switching pattern does not correspond to any permitted switching pattern, the assumption can be made that the switching pattern corresponds to a prohibited switching pattern, and vice versa. If both the number of permitted and the number of prohibited switching patterns are known to the monitoring unit, the switching pattern can preferably be compared based on both permitted and prohibited switching patterns. However, the number of permitted and the number of prohibited switching patterns cannot overlap, i.e. a switching pattern can be only permitted or prohibited.

The monitoring unit can output a permitted switching pattern in the event that the switching pattern matches one of the prohibited switching patterns and/or in the event of a deviation from the number of permitted switching patterns. The prohibited switching pattern is thus replaced with a permitted switching pattern by the monitoring unit. As soon as the control unit outputs a permitted switching pattern again, said switching pattern can be forwarded again by the monitoring unit.

The monitoring unit may be designed to output a permitted switching pattern in the event that the switching pattern matches one of the prohibited switching patterns and/or in the event of a deviation from the number of permitted switching patterns.

Furthermore, an action may be triggered in the event that the switching pattern matches a prohibited switching pattern and/or in the event of a deviation from the number of permitted switching patterns. An emergency stop, i.e. a disconnection or a restart of the inverter, or a part thereof, may be triggered as an action, for example. Alternatively or additionally, a signal may also be output as an action. The signal may be processed further by an additional unit. Alternatively or additionally, an optical and/or acoustic signal, for example, may also be output.

The monitoring unit preferably outputs the first switching pattern to the power switches in the event that the transition matches one of the prohibited transitions and/or in the event of a deviation from the number of permitted transitions. Therefore, a prohibited transition from the first switching pattern to the second switching pattern is thus prevented and the first switching pattern continues to be output.

It can further be ensured by means of the monitoring unit, in the event of a transition from a first switching pattern to a second switching pattern, that the second switching pattern is only output to the power switches after a safety time has elapsed. This may be necessary if a transition is fundamentally permitted, but only after a certain safety time during which, for example, decay processes take place.

The monitoring unit may be designed to ensure, in the event of a transition from a first switching pattern to a second switching pattern, that the second switching pattern is only output to the power switches after a safety time has elapsed.

Preferably, a first upper power switch is connected via an upper center point to a second upper power switch and a first lower power switch is connected via a lower center point to a second lower power switch, the upper center point and the lower center point being connected to the intermediate circuit center point, preferably each via diodes. Furthermore, an intermediate circuit is provided between the first input pole and the second input pole, which intermediate circuit comprises a first intermediate circuit capacitor and a second intermediate circuit capacitor that is connected via the intermediate circuit center point. The inverter thus corresponds to an NPC (neutral point clamped) multi-level inverter, specifically an NPC three-level inverter. Of course, an NPC inverter with more than three levels may also be provided. In the case of NPC multi-level inverters, prohibited switching patterns and transitions are particularly problematic, which is why the monitoring thereof by means of the monitoring unit according to the invention is particularly advantageous.

The monitoring unit is preferably designed to compare the switching patterns with at least one of the following prohibited switching patterns:

first upper power switch closed and second upper, first lower and second lower power switches open, second lower power switch closed and first lower, first upper and second upper power switches open, first upper and second lower power switches closed and second upper and first lower power switches open, first upper and first lower switches closed and second upper and second lower power switches open, second upper and second lower power switches closed and first upper and first lower power switches open, three (adjacent or non-adjacent) power switches closed, all power switches are closed.

Preferably, the monitoring unit is designed as an FPGA (field-programmable gate array), i.e. a (logic) gate array that can be programmed in the field (i.e. on-site). In this way, frequencies/sample rates of up to several 100 MHz are possible for the comparison with permitted switching patterns and/or permitted/prohibited transitions in order to be able to detect changes in the switching patterns in the ns range. Likewise, the comparison of the switching patterns with prohibited and/or permitted switching patterns can take place in parallel. The control unit of an inverter is usually designed as a digital signal processor (DSP), which cannot process signals at such high frequencies. It is also conceivable for the monitoring unit (e.g. as an FPGA) and the control unit (for example as a DSP) to be integrated together on an application-specific integrated circuit (ASIC). However, it should be ensured that the monitoring unit receives the switching patterns from the control unit and processes them independently of the control unit according to the present invention.

In the following, the present invention is described in greater detail with reference to FIGS. 1 to 8, which, by way of example, show schematic and non-limiting advantageous embodiments of the invention. In the drawings.

Figure 3:
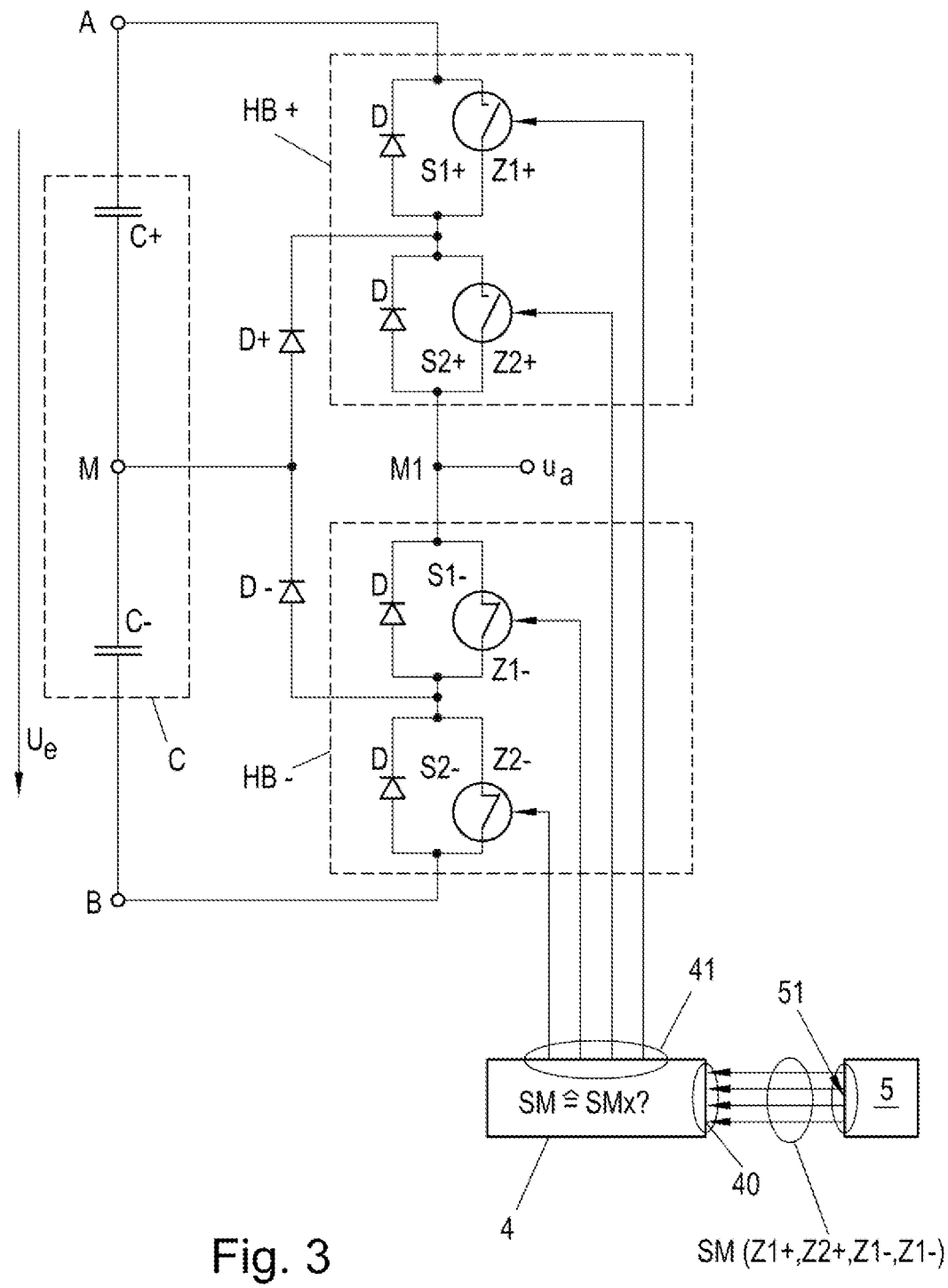
Figure 4:
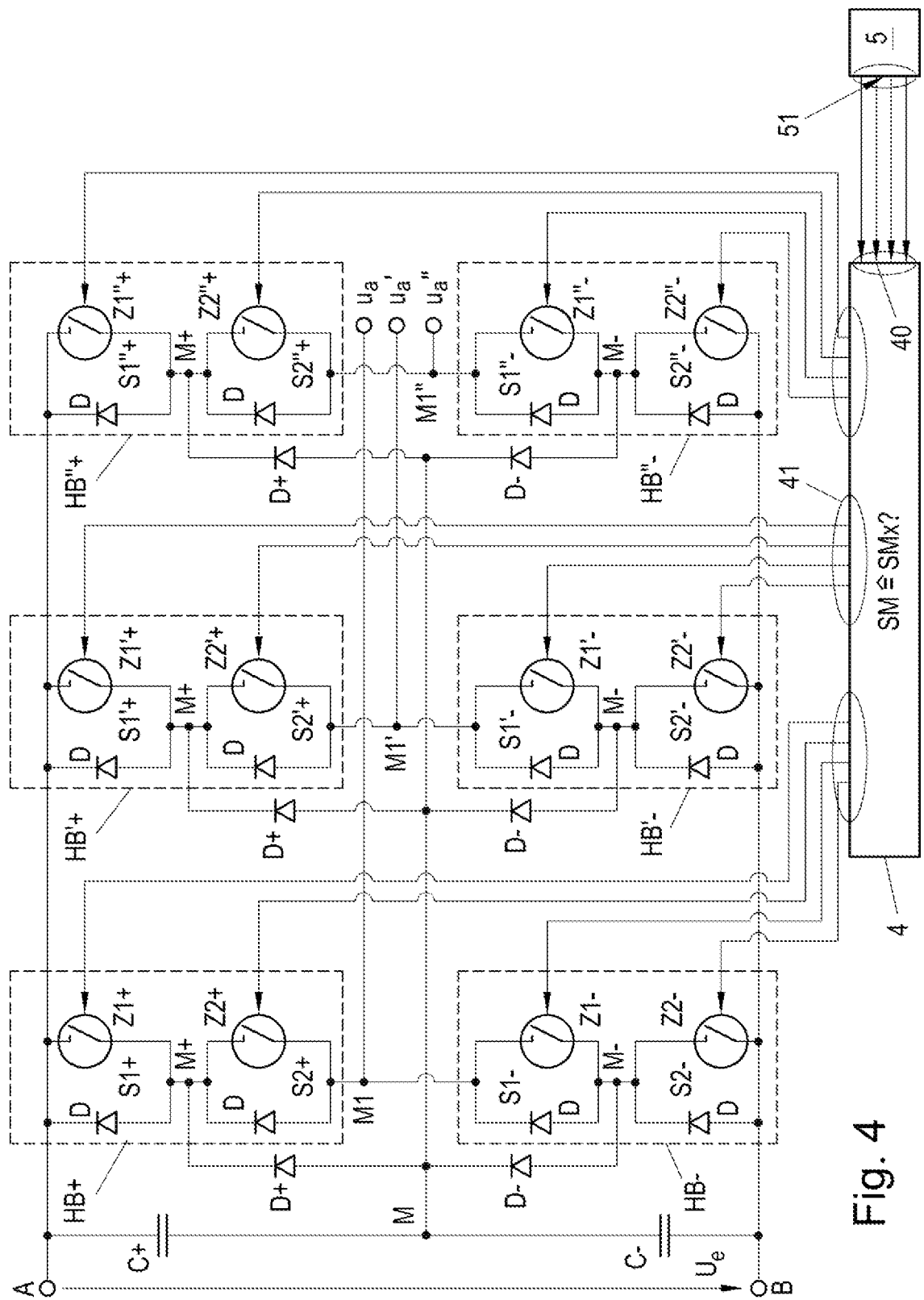
Figure 5C:
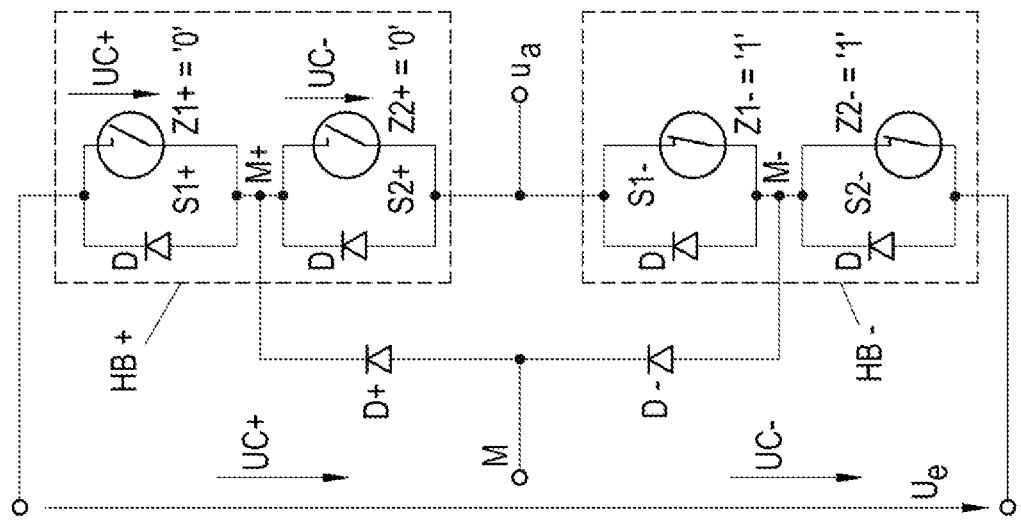
Figure 5B:
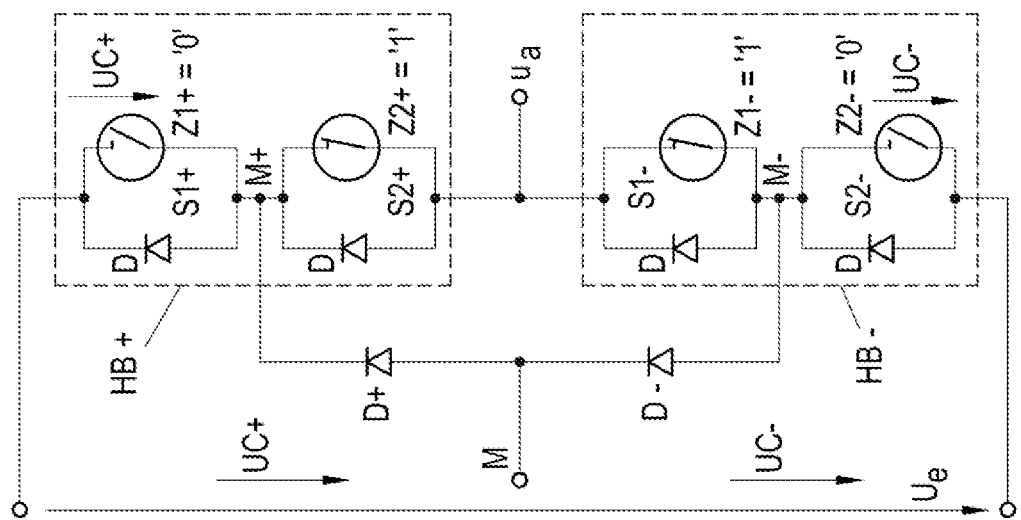
Figure 5A:
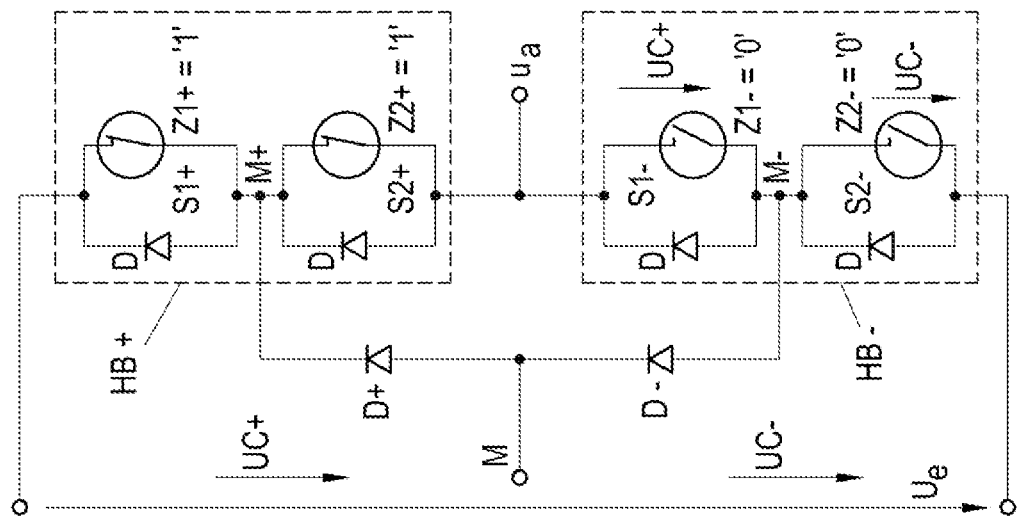
Figure 6C:
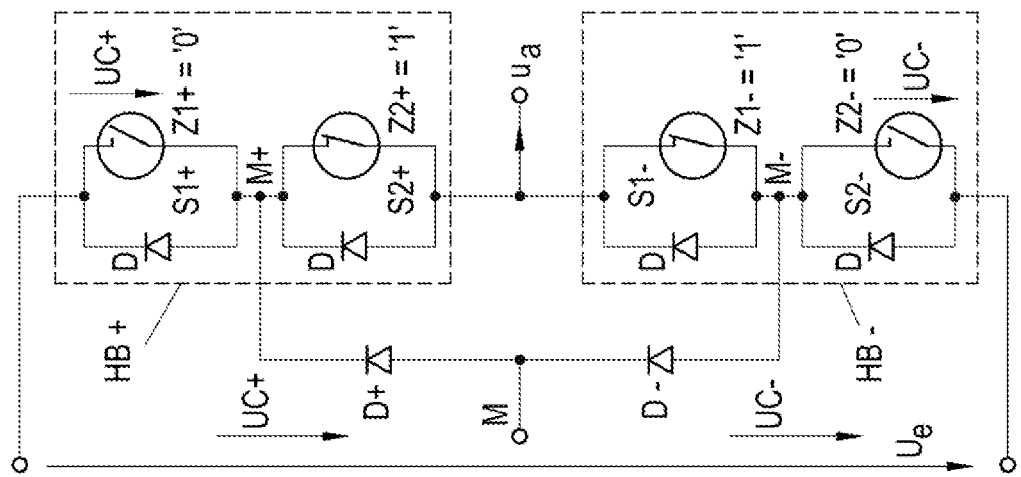
Figure 6B:
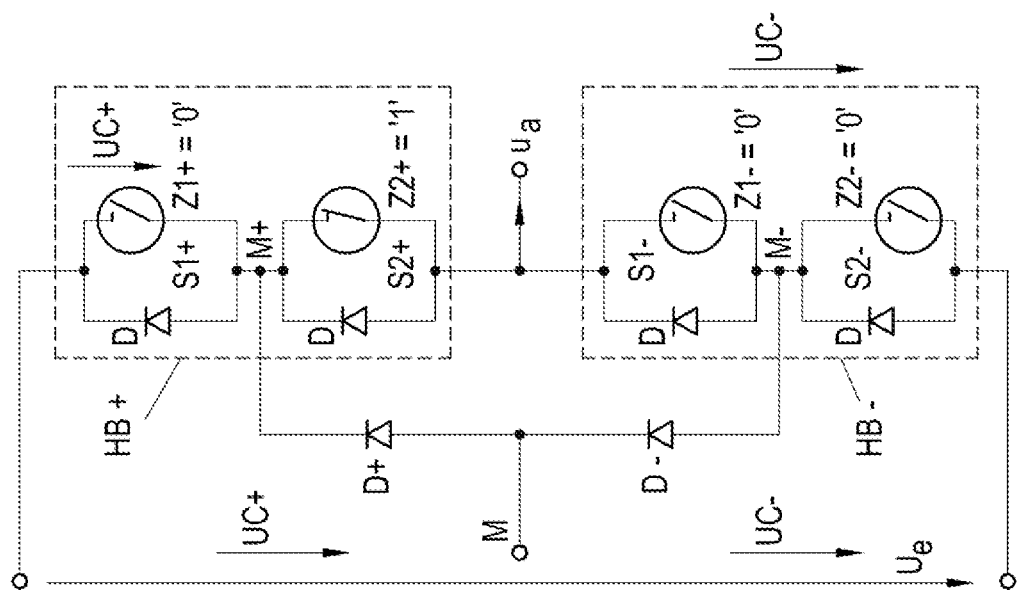
Figure 6A:
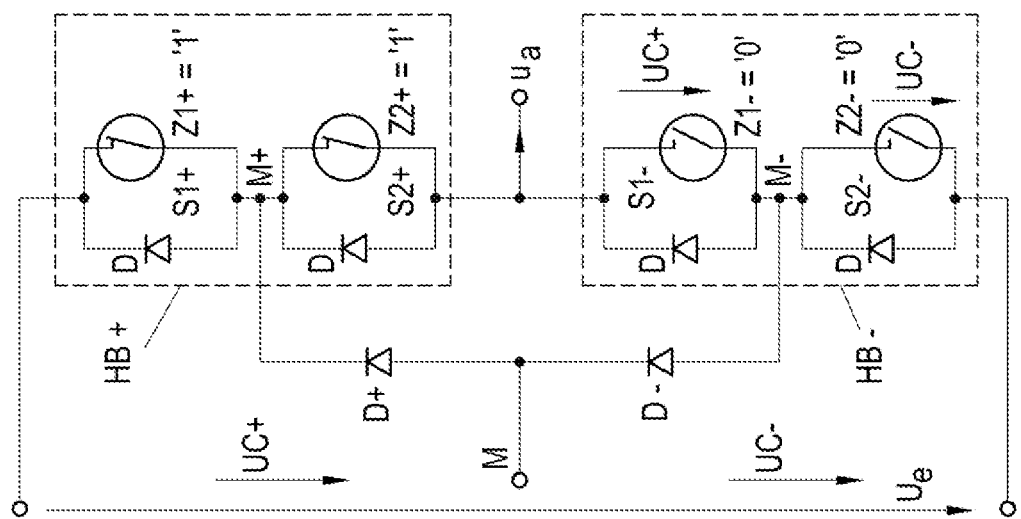
Figure 6D:
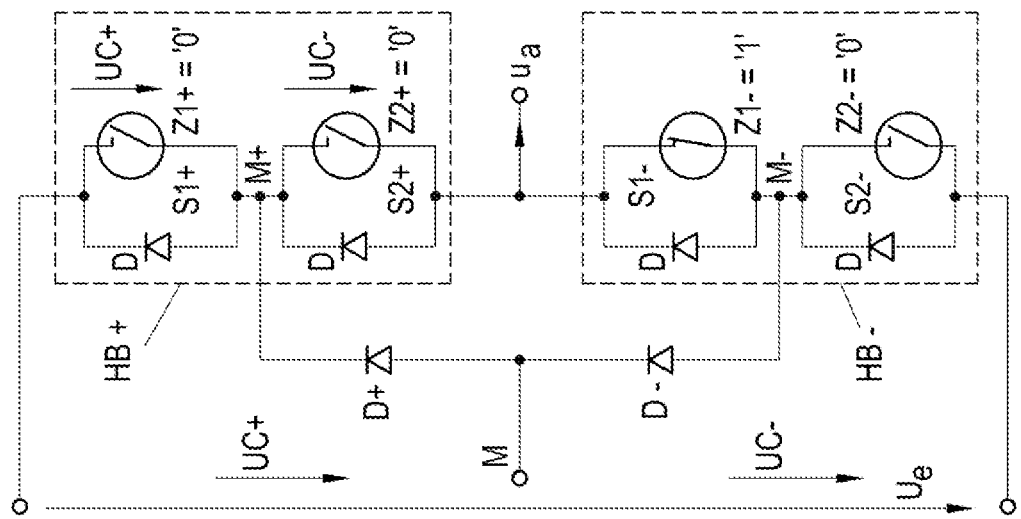
Figure 6E:
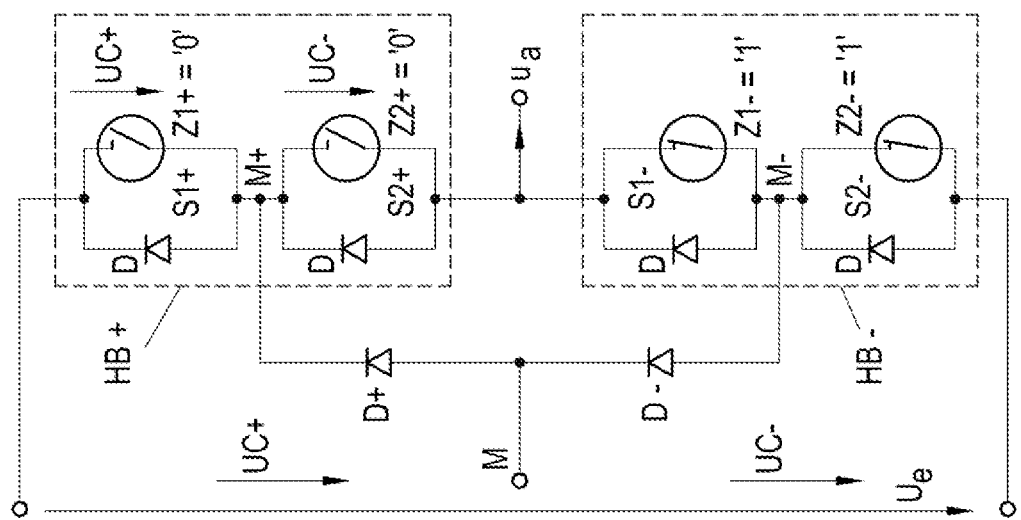
Figure 6F:
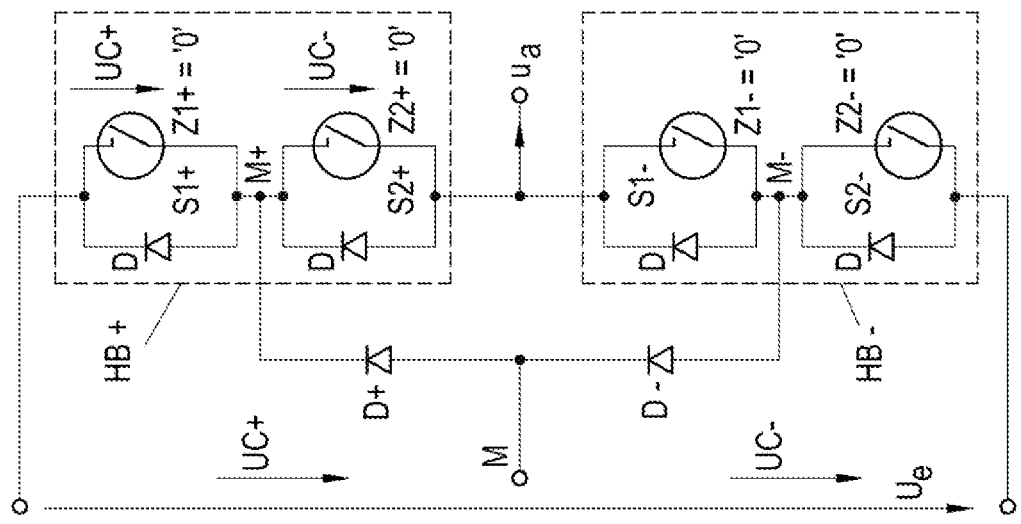
Figure 7C:
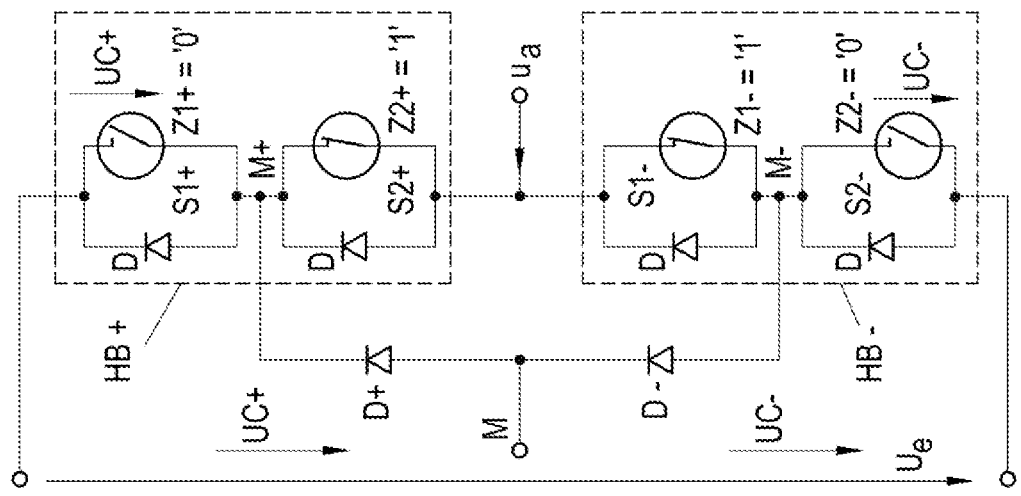
Figure 7B:
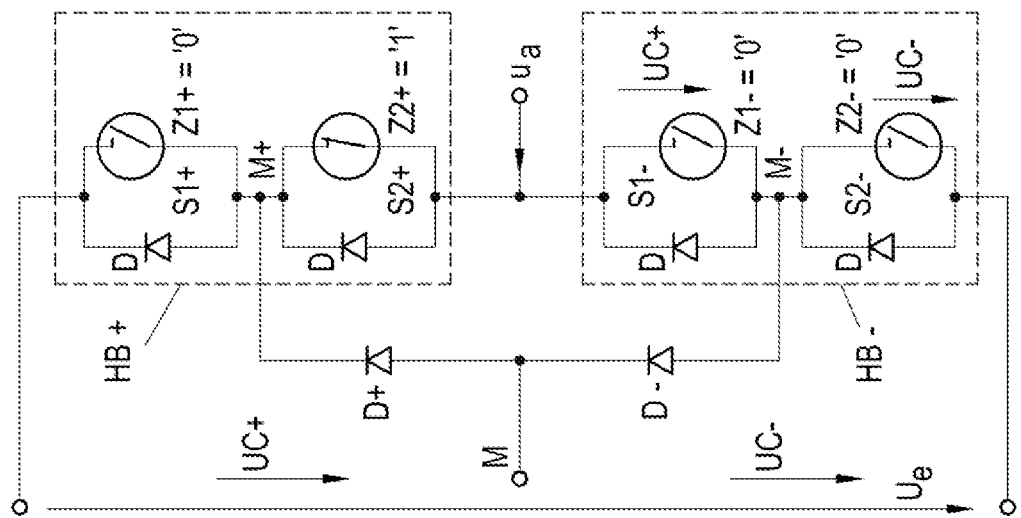
Figure 7A:
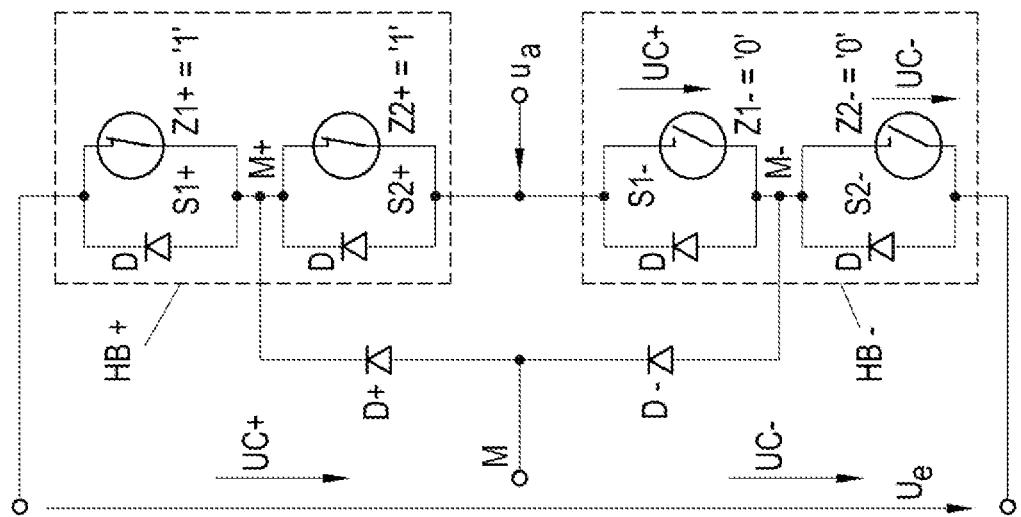
Figures 7D, 7E, 7F:
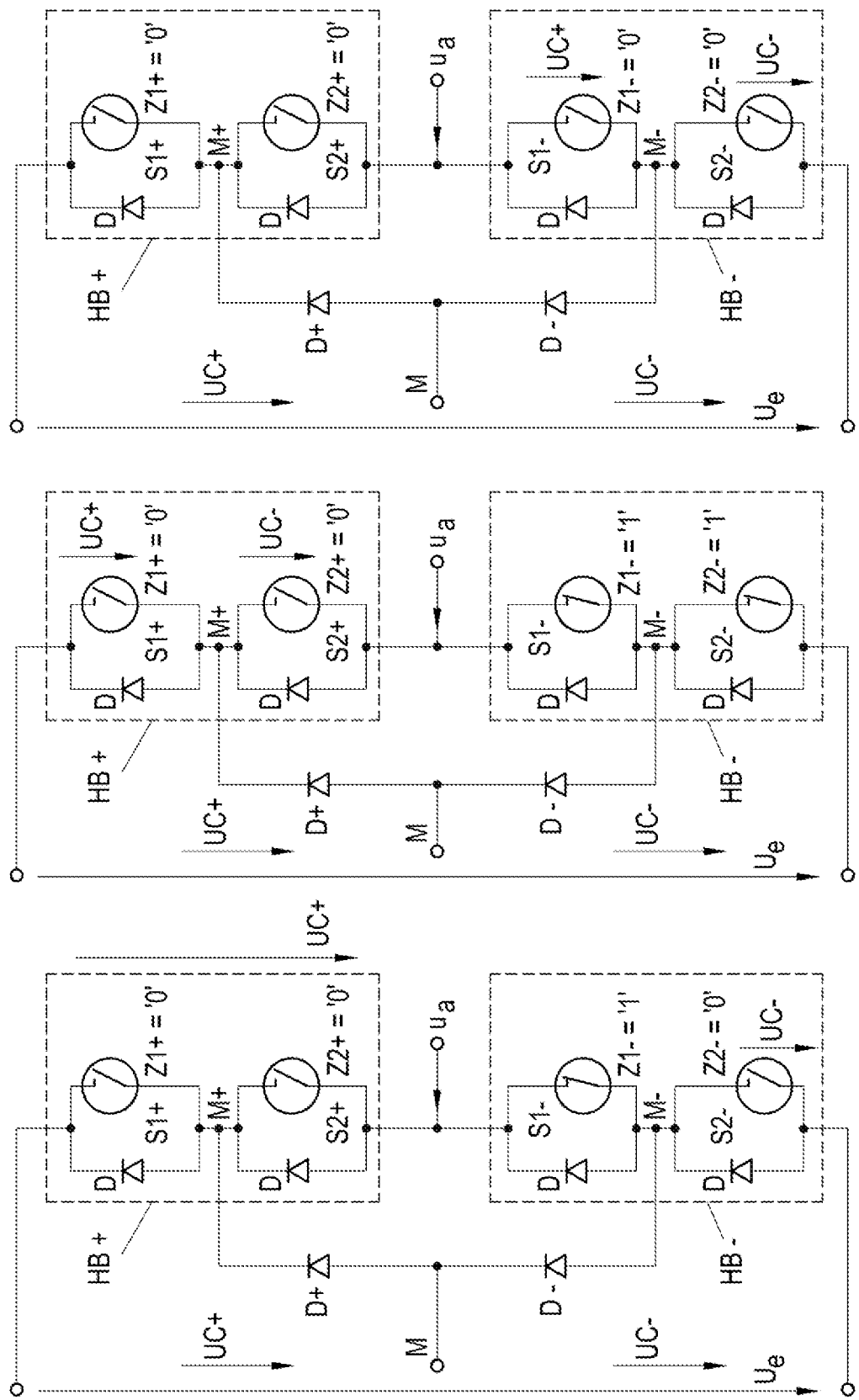
Figure 8:
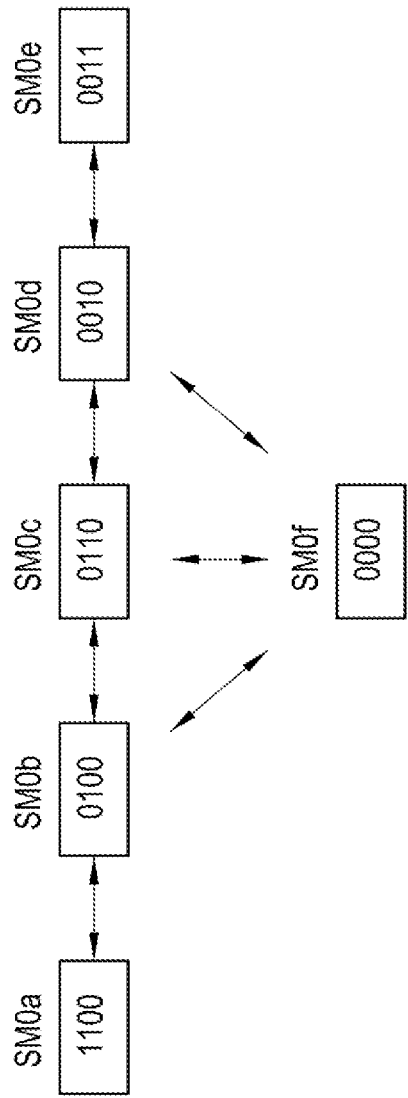

FIG. 3 shows a single-phase NPC (neutral point clamped) multi-level inverter, FIG. 4 shows a three-phase NPC (neutral point clamped) multi-level inverter, FIG. 5a, b, c show permitted switching patterns of a phase, FIG. 6a-f show switch voltages with permitted switching patterns when a positive output current is output, FIG. 7a-f show switch voltages with permitted switching patterns when a negative output current is output, FIG. 8 shows transitions between permitted switching patterns.

Figure 1:
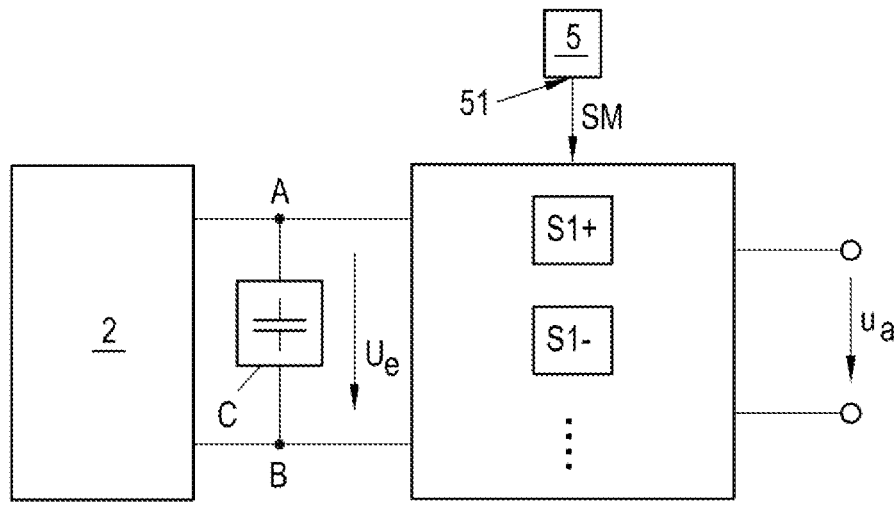
FIG. 1 shows a schematic inverter according to the prior art.

FIG. 1 shows a schematic inverter 1 according to the prior art, which has a DC voltage source 2, for example a photovoltaic system in generator mode, at its input. The DC voltage source 2 provides an input DC voltage Ue to the inverter between a first input pole A and a second input pole B, and converts the input DC voltage Ue into an output AC voltage ua. Furthermore, an optional capacitive intermediate circuit. C to which the input DC voltage Ue is applied is provided at the input of the inverter. A DC voltage converter may also be arranged between the DC voltage source 2 and the intermediate circuit C. The inverter 1 comprises a number of power switches (symbolically shown as "S1+, S1−" in FIG. 1), each of which has a switching state. In each case, either conductive, i.e. closed, or non-conductive, i.e. open, is provided as the switching state. The inverter 1 in FIG. 1 is single-phase, which means that an output AC voltage ua is output at the output. A schedule of the switching states of the power switches S1+, S1− of a phase branch is referred to as a switching pattern SM of this phase branch. Since only one phase branch is provided in FIG. 1, a switching pattern SM for the power switches S1+, S1− of this one phase branch is provided.

The switching pattern SM is output at a signal output 51 of a control unit 5 and provided to the power switches S1+, S1−. The control unit 5 is designed as a digital signal processor (DSP), for example. The input DC voltage Ue is converted into the output AC voltage ua by means of a specific time sequence of the switching patterns SM, which is generated by the control unit 5. The output AC voltage ua can be fed, for example, into a mains voltage of an energy supply network. Since the mode of operation of an inverter 1 is fundamentally known, the specific sequence of the switching patterns SM is not discussed in more detail at this point.

However, prohibited switching patterns SMx and/or prohibited switching transitions from a first (fundamentally permitted) switching pattern SM to a second (fundamentally permitted) switching pattern SM may be specified by means of the control unit 5. If the power switches S1+, S1− switch according to a prohibited switching pattern SMx or according to a prohibited switching transition, damage to the inverter 1, in particular the DC/AC voltage bridge 3, may occur.

Figure 2:
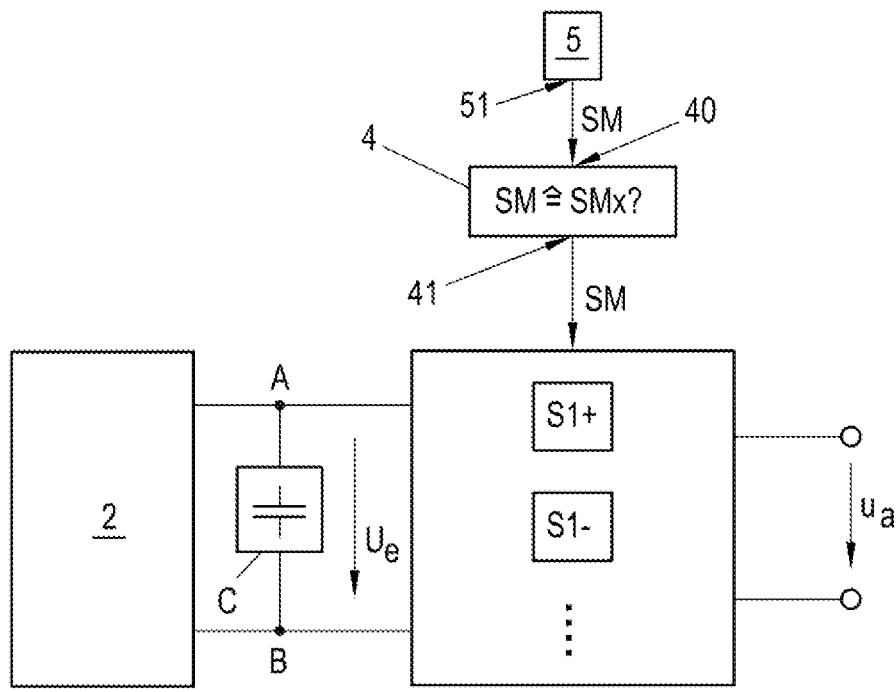
FIG. 2 shows a schematic inverter according to the invention.

In order to prevent this, a monitoring unit 4 is provided according to the invention between the control unit 5 and the power switches S1+, S1−, as shown in FIG. 2. The monitoring unit 4 is connected with its monitoring inputs 40 to the signal outputs 51 of the control unit 5 and checks independently of the control unit 5 whether the switching pattern SM currently specified by the control unit 5 corresponds to a prohibited switching pattern SMx from a number of prohibited switching patterns SMx. For this purpose, a table with a number of prohibited switching patterns SMx may be present at the monitoring unit 4, for example, the switching pattern SM being compared against the prohibited switching patterns SMx. If the switching pattern SM corresponds to one of the prohibited switching patterns SMx, the switching pattern SM output by the control unit 5 is blocked by the monitoring unit 4, i.e. not forwarded to the power switches S1+, S1−. Instead, a permitted switching pattern SM0 is advantageously output, for example the last permitted switching pattern generated by the control unit 5. Furthermore, an action N may be triggered, for example an emergency stop and/or a, for example, optical and/or acoustic signal may be output. A warning signal may also be output by the monitoring unit 4 and processed further by another unit. If the monitoring unit 4 determines that the switching pattern SM output by the control unit 5 deviates from the number of prohibited switching patterns SMx, i.e. does not correspond to the number of prohibited switching patterns SMx, it can advantageously be assumed that the current switching pattern SM corresponds to a permitted switching pattern SM0. In this case, the current switching pattern SM is output by the monitoring unit 4 to the power switches S1+, S1−. Instead of the switching patterns SM output by the control unit 5 being compared with a number of prohibited switching patterns SMx, a comparison with a number of permitted switching patterns SM0 may, of course, also take place. In this case, in the event that the switching pattern SM deviates from the number of permitted switching patterns SM0, the monitoring unit 4 blocks the switching pattern SM and outputs the switching pattern SM to the power switches S1+, S1− in the event that the switching pattern SM matches a permitted switching pattern SM0. Of course, the monitoring unit 4, independently of the control unit 5, may also compare the switching pattern SM with a number of prohibited switching patterns SMx and a number of permitted switching patterns SM0. Of course, the number of prohibited switching patterns SMx must not overlap with the number of permitted switching patterns SM0, i.e. a switching pattern SM can only be prohibited or permitted.

In addition, it can be provided that the monitoring unit 4, independently of the control unit 5, checks whether the control unit 5 generates a prohibited transition from a first (fundamentally permitted) switching pattern SM1 to a second (fundamentally permitted) switching pattern SM2. If this is the case, the prohibited transition is blocked by the monitoring unit 4, i.e. the power switches S1+, S1− are prevented from (directly) switching from the first switching pattern SM1 to the second switching pattern SM2. For this purpose, the monitoring unit 4 may, for example, transmit a third (permitted) switching pattern SM3 instead of the second switching pattern SM2 to the power switches S1+, S1−, it naturally being necessary for the transition from the first switching pattern SM1 to the third switching pattern SM3 to be permitted. Subsequently, the monitoring unit 4 can output the second switching pattern SM2 if the transition from the third switching pattern SM3 to the second switching pattern SM2 is permitted. Therefore, instead of a prohibited transition from a first switching pattern SM1 to a second switching pattern SM2, a detour via any number of permitted transitions may take place, it naturally be necessary for the respective switching patterns SM to which a transition is made to themselves be permitted.

Instead of the prohibited transition, the monitoring unit 4 may also continue to output the first switching pattern SM1, which is permitted, to the power switches S1+, S1−, or to prompt a permitted transition to another permitted switching pattern SM at the power switches S1+, S1−. Furthermore, if the monitoring unit 4 detects a prohibited transition, an action N can be triggered, for example an emergency stop and/or a, for example, optical and/or acoustic signal, etc.

If the monitoring unit 4 determines that the control unit 5 outputs a permitted transition from a first switching pattern SM1 to a second switching pattern SM2, the monitoring unit 4 outputs this permitted transition, i.e. the second switching pattern SM2, to the power switches S1+, S1−.

Of course, as already explained with reference to the permitted switching patterns SM0 and the prohibited switching patterns SMx, a comparison with prohibited transitions from a first switching pattern SM1 to a second switching pattern SM2 may take place as an alternative or in addition to the comparison with permitted transitions, and the second switching pattern SM2 can be blocked in the event that a prohibited transition is detected by the monitoring unit 4 and the second switching pattern SM2 can be output to the power switches S1+, S1− in the event that a permitted transition is determined by the monitoring unit 4.

FIG. 3 shows a preferred embodiment of an inverter 1 in the form of a single-phase NPC (neutral point clamped) multi-level (in this case, three-level) inverter. The intermediate circuit C in this case comprises an upper intermediate circuit capacitor C+ and a lower intermediate circuit capacitor C− that is connected in series. The input DC voltage Ue lies between a first input pole A and a second input pole B, wherein the series connection of the two DC link capacitors C+, C− is arranged between the first input pole A and the second input pole B. An intermediate circuit center point M is advantageously located between the upper intermediate circuit capacitor C+ and the lower intermediate circuit capacitor C−. The upper intermediate circuit capacitor C+ and the lower intermediate circuit capacitor C− thus form the intermediate circuit C, it naturally also being possible to provide additional serial and/or parallel capacitors in the intermediate circuit Z. In addition, the first input pole A is connected to the second input pole B via an upper half bridge HB+ and an associated lower half bridge HB− that is connected in series, and therefore the input voltage Ue is in each case applied to the series circuit of the upper half bridge HB+ and associated lower half bridge HB−. The upper half bridge HB+ and lower half bridge HB− thus form a DC/AC voltage bridge. An output pole is located between the upper half bridge HB+ and the associated lower half bridge HB−. The output pole may further be provided with clock filters (e.g. a clock filter inductor connected in series and/or a clock filter capacitor connected to ground). The output AC voltage ua, which can be fed into an energy supply network, for example, is located at the output pole.

In the embodiment shown, the upper half bridge HB+ comprises an upper power switch S1+ and a lower power switch S2+ that is connected in series, an upper center point M+ being located between the upper power switch S1+ and the lower power switch S2+. In the upper half bridge HB+, free-wheeling diodes D are in each case arranged parallel to the upper power switch S1+ and lower power switch S2+ which are polarized in the direction of the first pole A. The intermediate circuit center point M is also connected via an upper diode D1+ to the upper center point M+, which is polarized in the direction of the upper center point M+.

In the embodiment shown, the lower half bridge HB− similarly comprises an upper power switch S1− and a lower power switch S2− that is connected in series, a lower center point M− being located between the upper power switch S1− and the associated lower power switch S2−. A freewheeling diode D is arranged parallel to the first upper power switch S1− and the first lower power switch S2− and is polarized in the direction of the associated upper center point M+, i.e. in the direction of the first pole A. The lower center point M1− is connected to the intermediate circuit center point M via a lower diodes D+, the lower diode D1− being polarized in the direction of the intermediate circuit center point M. Of course, the upper and/or lower half bridge HB+, HB− may also comprise additional power switches and/or the inverter may comprise additional half bridges, for example in order to increase the power of the inverter 1.

The power switches S1+, S2+ of the upper half bridge HB+ of the upper half bridge HB+ and each have a switching state Z1+, Z2+ and the power switches S1−, S2− of the lower half bridge HB− each have a switching state Z1−, Z2−. The switching state Z1+, Z2+, Z1−, Z2− is provided in each case as conductive, i.e. closed, or non-conductive, i.e. open, the power switches S1+, S2+, S1−, S2− being 1-active in the embodiment shown. This means that the power switches S1+, S2+, S1−, S2− are each closed at a switching state Z1+, Z2+, Z1−, Z2− of '1' and are open in a switching state Z1+, Z2+, Z1−, Z2− of '0'.

The switching states Z1+, Z2+, Z1−, Z2− of the power switches S1+, S2+. S1−, S2− of one phase are described in the following as a four-digit switching pattern SM of this phase. The first digit represents the switching state Z1+ of the first upper power switch S1+, the second digit represents the switching state Z2+ of the second upper power switch S2+, the third digit represents the switching state Z1− of the first lower power switch S1− and the fourth digit represents the switching state Z2− of the second lower power switch S2−.

The inverter 1 shown, designed as a multi-level NPC inverter, is characterized in that the intermediate circuit C is divided into two intermediate circuit capacitors C+ and C−.

The input DC voltage Ue is thus distributed between the two intermediate circuit capacitors C+ and C−, the upper intermediate circuit voltage UC1 being applied to the upper intermediate circuit capacitor C+ and the lower intermediate circuit voltage UC2 being applied to the lower intermediate circuit capacitor C−. In combination with the distribution between an upper half bridge HB+ and a lower half bridge HB− (multi-level inverter), the advantage is that, depending on the present switching pattern SM, the entire input DC voltage Ue is not applied to the respective power switches S1+, S2+, S1−, S2−, but rather only the portion which is applied as the intermediate circuit voltage UC+, UC− to the relevant intermediate circuit capacitor C+, C−. Therefore, for example, in the case of an input DC voltage Ue of 1000 V and intermediate circuit voltages UC+, UC− of 500 V in each case, IGBTs (bipolar transistor with insulated gate electrode) can also be used as power switches S1+, S2+, S1−, S2−. The power switches S1+, S2+, S1−, S2− thus only have to withstand a voltage of 500 V.

In this embodiment, however, prohibited switching patterns SMx result, which are particularly dangerous. For this reason, a monitoring unit 4 according to the invention is provided between the control unit 5 and the power switches S1+, S2+, S1−, S2−, monitoring inputs 40 of the monitoring unit 4 being connected to control outputs 51 of the control unit 5. The monitoring unit 4 therefore receives the switching pattern SM (Z1+, Z2+, Z1−, Z2−) specified by the control unit 5 and compares it in each case with a number of prohibited switching patterns SMx. If the control unit 5 outputs a prohibited switching pattern SMx at its control outputs 51, it is blocked by the monitoring unit 4, i.e. not forwarded to the power switches S1+, S2+, S1−, S2−. Instead, an action N can be triggered by the monitoring unit 4, for example, or a permitted switching pattern SM0 can be output to the power switches S1+, S2+, S1−, S2−. If, during the comparison of a current switching pattern SM with the number of permitted switching patterns SMx, the monitoring unit 4 determines that the switching pattern SM is permitted, the monitoring unit 4 outputs the switching pattern SM to the respective power switches S1+, S2+, S1−, S2−.

Conversely, as mentioned above, a comparison of the switching pattern SM with a number of permitted switching patterns SM0 may of course be carried out. If the control unit 5 outputs a permitted switching pattern SMx at its control outputs 51, the monitoring unit 4 outputs the switching pattern SM to the respective power switches S1+, S2+, S1−, S2−. If the control unit 5 outputs a prohibited switching pattern SMx at its control outputs 51, said switching pattern is blocked by the monitoring unit 4, i.e. not forwarded to the power switches S1+, S2+, S1−, S2−.

Of course, the inverter 1 may also comprise a plurality of phases and thus phase branches. FIG. 4 shows an example of a three-phase inverter 1. This inverter 1 differs from the single-phase inverter according to FIG. 3 in that the DC/AC voltage bridge comprises an upper half bridge HB+, HB'+, HB"+ and an associated lower half bridge HB−, HB'−, HB"− per phase branch. Therefore, a total of three upper half bridges HB+, HB'+, HB"+ and three lower half bridges HB−, HB'−, HB"− are provided for three phase branches. The first pole A is connected to the second pole B in each case via the upper half bridge HB+, HB'+, HB"+ and the associated lower half bridge HB−, HB'−, HB"− that is connected in series via the relevant output pole, and therefore the input DC voltage De is applied in each case to the series circuit of the upper half bridges HB+, HB'+, HB"+ and associated lower half bridges HB−, HB'−, HB"− of each phase. The upper half bridges HB+, HB'+, HB"+ each comprise an upper power switch S1+, S1'+, S1"+ and a lower power switch S2+, S2'+, S2"+ that is connected in series, an upper center point M1+, M1'+, M1"+ being located between the upper power switches S1+, S1'+, S1"+ and the associated lower power switches S2+, S2'+, S2"+. In the upper half bridges HB+, HB'+, HB"+, free-wheeling diodes D are in each case arranged parallel to the upper power switches S1+, S1'+, S1"+ and lower power switches S2+, S2'+, S2"+ and are polarized in the direction of the first pole A. The intermediate circuit center point M is also connected via upper diodes D+, D'+, D"+ to the upper center points M+, M'+, M"+ and are polarized in the direction of the upper center points M+, M'+, M"+. In the embodiment shown here, the lower half bridges HB−, HB'−, HB"− similarly comprise an upper power switch S1−, S1'−, S1"− and a lower power switch SS2−, S2'−, S2'− that is in each case connected in series, a lower center point M−, M'−, M"− in each case being located between the upper power switches S1−, S1'−, S1"− and the associated lower power switches S2−, S2'−, S2"−. Free-wheeling diodes D are in each case arranged parallel to the upper power switches S1−, S1'−, S1"− and the lower power switches S2−, S2'−, S2"− and are polarized in the direction of the associated center point M, M', M", i.e. in the direction of the first pole A. The lower center points M−, M'−, M"− are connected to the intermediate circuit center point M via lower diodes D−, D'−, D"−, the lower diodes D−, D'−, D"− being polarized in the direction of the intermediate circuit center point M.

The power switches S1+, S1'+, S1", S1−, S1−', S1"−, S2+, S2'+, S2"+, S2−, S2'−, S2"− of the half bridges HB1+, HB2+, HB3+, HB1−, HB2−, HB3− are each controlled by the control circuit 5 in such a way that the input DC voltage Ue is converted into one output AC voltage ua, ua', ua" per phase branch via the intermediate circuit Z and the power switches S1+, S1'+, S1", S1−, S1'−, S1"−S2+, S2'+, S2"+, S2−, S2'−, S2"− (as part of the DC/AC voltage bridge). The output AC voltages ua, ua', ua" are applied to the relevant output pole in each phase branch, clock filters (e.g. clock filter inductors in each case connected in series and/or clock capacitors connected between the phase branches in star connection) may also be provided at the output poles. The output AC voltages ua, ua', ua" can be fed in at the relevant output pole of the inverter 1 in each case in network phases of an energy supply network, it also being possible to provide mains filters. The energy supply network comprises a number of phases, each of which has a phase-shifted mains voltage (for example 230 volts) with a mains frequency f (for example 50 Hz). The output AC voltages ua, ua', ua" are preferably synchronized with the relevant network voltage in order to allow them to be fed into the energy supply network.

As in the embodiment shown in FIG. 3, a monitoring unit 4 according to the invention is also provided between the control unit 5 and the power switches S1+, S1'+, S1", S1−, S1'−, S1"−S2+, S2'+, S2"+, S2−, S2'−, S2"− in the embodiment shown in FIG. 4. The monitoring unit 4 compares the switching pattern SM specified by the control unit 5 with a number of prohibited switching patterns SM, one switching pattern SM being considered per phase. The switching patterns SM of the individual phase branches can be compared independently of one another with the prohibited/permitted switching patterns SMx/SM0. A switching pattern SM that also comprises switching states of power switches of a plurality of phase branches may also be provided, and this switching pattern is compared with correspondingly prohibited/permitted switching patterns SMx/SM0.

The switching patterns SM of a single-phase inverter 1 according to FIG. 3 are discussed by way of example considering FIGS. 5 to 8 in combination; however, the invention can of course also be applied to other types of inverter 1, for example a three-phase inverter 1 according to FIG. 4.

For the inverter according to FIG. 3, there are six permitted switching patterns SM0 and ten prohibited switching patterns SMx, it being possible to categorize the prohibited switching patterns SMx into potentially destructive and destructive switching patterns.

Destructive switching patterns (not shown in the figures) are produced when three adjacent or also non-adjacent power switches are closed at the same time: '1110', '0111', '1101', '1011' or if all power switches S1+, S2+, S1−, S2− are closed at the same time: '1111'. Destructive switching patterns lead to short circuits or to impermissibly high voltage drops at the power switches S1+, S2+, S1−, S2− and thus also to destruction of a power switch S1+, S2+, S1−, S2− even if they occur for a short period of time. Potentially destructive switching patterns can lead to damage to the inverter 1, in particular the power switches S1+, S2+, S1−, S2−, depending on external circumstances. If, for example, the first upper power switch S1+ is closed while the output AC voltage ua reaches its negative peak value, this leads to the reverse bias voltage of the relevant first upper power switch S1+ being exceeded. Potentially destructive switching patterns are dependent on the switching states of other phase branches (in the case of multi-phase inverters 1) and on the current output AC voltage ua. The switching patterns '1000', '0001', '1001'. '1010', '0101' are potentially destructive to the inverter 1 according to FIG. 3. The inverter 1 according to FIG. 3 thus has ten prohibited switching patterns SMx (five destructive and five potentially destructive switching patterns).

Preferably, the monitoring unit 4 prevents potentially destructive switching patterns, as well as destructive switching patterns, from reaching the power switches S1+, S2+, S1−, S2−.

Permitted switching patterns SM0 result, for example, when two adjacent power switches are closed (and the other power switches are open): '1100', '0110', '0011'. FIGS. 5a, 5b and 5c each show these permitted switching patterns SM0, the corresponding switching states Z1+, Z2+, Z1−, Z2− of the switching pattern SM, i.e. the positions of the power switches S1+, S2+, S1−, S2−, being shown. In FIG. 5a, the permitted switching pattern SM0 '1100' is present, and therefore the upper intermediate circuit voltage UC+ is applied to the first lower power switch S1− and the lower intermediate circuit voltage UC− is applied to the second lower power switch S2−. In contrast, in FIG. 5b, the permitted switching pattern SM0 '0110' is present, and therefore the upper intermediate circuit voltage UC+ is applied to the first upper power switch S1+ and the lower intermediate circuit voltage UC− is applied to the second lower power switch S2−. In FIG. 5c, the permitted switching pattern SM0 '0011' is present, and therefore the upper intermediate circuit voltage UC+ is applied to the first upper power switch S1+ and the lower intermediate circuit voltage UC− is applied to the second upper power switch S2+. In summary, the switching patterns SM shown in FIG. 5a, b, c are permitted switching patterns SM0, since only the upper or lower intermediate circuit voltage UC+, UC− is applied to the relevant power switch S1+, S2+, S1−, S2−.

Another permitted switching pattern SM0 results when all power switches S1+, S2+, S1−, S2− are open, i.e. the DC/AC voltage bridge 3 is switched off: '0000'. Furthermore, permitted switching patterns SM0 are present if only the second upper power switch S2+ or the first lower power switch S1− is closed: '0100', '0010'.

FIGS. 6a to 6f show all six permitted switching patterns SM0, the permitted switching pattern SM0a '1100' being shown in FIG. 6a, the permitted switching pattern SM0b '0100' being shown in FIG. 6b, the permitted switching pattern SM0c '0110' being shown in FIG. 6c, the permitted switching pattern SM0d '0010' being shown in FIG. 6d, the permitted switching pattern SM0e '0011' being shown in FIG. 6e, and the permitted switching pattern SM0f '0000' being shown in FIG. 6f. Furthermore, FIGS. 6a to 6f show the voltages at the power switches S1+, S2+, S1−, S2− with a positive output current ia, i.e. an output current is flowing out of the output pole.

Thus, in FIG. 6a, the upper intermediate circuit voltage UC+ is applied to the first lower power switch S1− and the lower intermediate circuit voltage UC− is applied to the second lower power switch S2−.

In FIG. 6b, the upper intermediate circuit voltage UC+ is applied to the first upper power switch S1+ and the lower intermediate circuit voltage UC− is applied to the series circuit of the first and second lower power switches S1−, S2−.

In FIG. 6c, the upper intermediate circuit voltage UC+ is applied to the first upper power switch S1+ and the lower intermediate circuit voltage UC− is applied to the second lower power switch S2−.

In FIG. 6d, as in FIG. 6e and FIG. 6f, the upper intermediate circuit voltage UC+ is applied to the first upper power switch S1+ and the lower intermediate circuit voltage UC− is applied to the second upper power switch S2+.

FIGS. 7a to 7l show the same six permitted shifting patterns SM0a, SM0b, SM0G, SM0d, SM0e, SM0f as FIGS. 6a to 6f; however, the voltages at the power switches S1+, S2+, S1−, S2− are shown with a negative output current is, i.e. flowing into the output pole.

Thus, in FIG. 7a, similarly to FIG. 6a, the upper intermediate circuit voltage UC+ is applied to the first lower power switch S1− and the lower intermediate circuit voltage UC− is applied to the second lower power switch S2−.

In FIG. 7b, however, the upper intermediate circuit voltage UC+ is applied to the first lower power switch S1− and the lower intermediate circuit voltage UC− is applied to the second lower power switch S2−.

In FIG. 7c, as in FIG. 6c, the upper intermediate circuit voltage UC+ is applied to the first upper power switch S1+ and the lower intermediate circuit voltage UC− is applied to the second lower power switch S2−.

In FIG. 7d, however, in contrast to FIG. 6d, the upper intermediate circuit voltage UC+ is applied to a series circuit of the upper power switches S1+, S2+ and the lower intermediate circuit voltage UC− is applied to the second lower power switch S2−.

In FIG. 7e, as in FIG. 6e, the upper intermediate circuit voltage UC+ is applied to the first upper power switch S1+ and the lower intermediate circuit voltage UC− is applied to the second upper power switch S2+.

In contrast to FIG. 6f, in FIG. 7f, the upper intermediate circuit voltage UC+ is applied to the first lower power switch S1− and the lower intermediate circuit voltage UC− is applied to the second lower power switch S2−.

In addition to or instead of checking the switching pattern SM itself with regard to permitted switching patterns SM0 or prohibited switching patterns SMx, transitions from a first (fundamentally permitted) switching pattern SM1 to a second (fundamentally permitted) switching pattern SM2 may also be prohibited or permitted. FIG. 8 shows the permitted transitions. Thus, a transition from the permitted switching pattern SM0a '1100' (corresponding to FIG. 6a) to the permitted switching pattern SM0c '0110' (corresponding to FIG. 6c) and vice versa is prohibited. If the permitted switching pattern SM0a '1100' is switched directly into the permitted switching pattern SM0c '0110', i.e. the second upper circuit breaker S2+ is opened directly, the upper half bridge HB+ may constitute a short circuit, as a result of which the upper intermediate circuit capacitor C+ is short-circuited.

In order to ensure such a transition in spite of that, the permitted switching pattern SM0b '0100' is provided between the permitted switching pattern SM0a '1100' and the permitted switching pattern SM0c '0110'. This means that a switch is made from the permitted switching pattern SM0a '1100' via the permitted switching pattern SM0b '0100' to the permitted switching pattern SM0c '0110' and likewise from the switching pattern SM0c '0110' via the switching pattern SM0b '0100' to the switching pattern SM0a '1100'.

Likewise, a transition from the permitted switching pattern SM0c '0110' to the permitted switching pattern SM0e '0011' (corresponding to FIG. 6e) and vice versa are prohibited. Therefore, the permitted switching pattern SM0d '0010' (corresponding to FIG. 6d) is provided between the permitted switching pattern SM0c '0110' and the permitted switching pattern SM0e '0011'. This means that a switch is made from the permitted switching pattern SM0c '0110' via the permitted switching pattern SM0d '0010' to the permitted switching pattern SM0e '0011' and likewise from the permitted switching pattern SM0e '0011' via the permitted switching pattern SM0d '0010' to the permitted switching pattern SM0c '0110'.

During the transition from the permitted switching pattern SM0a '1100' via the permitted switching pattern SM0b '0100' to the permitted switching pattern SM0c '0110', first the first upper power switch S1+ is opened (first upper switching state Z1+ goes from '1' to '0'), as a result of which the voltage at the first upper power switch S1+ increases and the voltage at the lower power switches S1−, S2− decreases. As soon as the voltage at the first upper power switch S1+ has reached the upper intermediate circuit voltage C+, the upper diode D+ becomes conductive. The voltage at the first upper power switch S1+ no longer increases from this point in time, as a result of which the first upper power switch S1+ is protected against overvoltage. Subsequently, the first lower power switch S1− is closed (first lower switching state Z1− goes from 0 to 1), thus producing the permitted switching pattern SM0c '0110' (according to FIG. 6c), Alternatively, according to FIG. 8, after the upper diode D+ becomes conductive, a switch is made to the permitted switching pattern SM0f '0000' (FIG. 6f).

In the case of a negative output current ia, during the transition from the permitted switching pattern SM0e '0011' (corresponding to FIG. 7e) to the permitted switching pattern SM0c '0110' (corresponding to FIG. 7c) via the permitted switching pattern SM0d 0010 (corresponding to FIG. 7d), first the second lower power switch S2− is opened (second lower switching state Z2− goes from '1' to '0'), as a result of which the voltage at the second lower power switch S2− increases and the voltage at the upper power switches S1+, S2+ decreases. As soon as the voltage at the second lower power switch S2− has reached the lower intermediate circuit voltage C−, the lower diode D− becomes conductive. The voltage at the second lower power switch S2− no longer increases from this point in time, as a result of which the second lower power switch S2− is protected against overvoltage.

Subsequently, the second upper circuit breaker S2+ is closed (second upper switching state Z2+ goes from 0 to 1), thus producing the permitted switching pattern SM0c 0110 (FIG. 7c). Alternatively, according to FIG. 8, after the lower diode D− becomes conductive, a switch is made to the switching pattern SM0f '0000' (corresponding to FIG. 7f).

As mentioned, the permitted switching pattern SM0f '0000' (FIG. 6f) is provided for a positive output current ia (FIG. 6) and a negative output current ia (FIG. 7), which switching pattern corresponds to a deactivated DC/AC voltage bridge. It is possible to switch into and out of this permitted switching pattern SM0f '0000' from and to the permitted switching pattern SM0b '0100' (FIG. 6b, 7b), the permitted switching pattern SM0c '0110' (FIG. 6C, 7c) and the permitted switching pattern SM0d '0010' (FIG. 6d, 7d). However, a transition from the permitted switching pattern SM0f '0000' to the permitted switching patterns SM0a '1100' (FIG. 6a, 7a) or SM0e '0011' (FIG. 6e, 7e) and vice versa is prohibited. This prohibition results from the fact that switching of the first upper power switch S1+/second lower power switch S2− before the second upper power switch S2+/first lower power switch S2+ cannot be guaranteed.

In order to monitor a switching pattern SM output by the control unit 5, a monitoring unit 4 is provided according to the invention. The monitoring unit 4 checks the switching pattern SM specified by the control unit 5 and compares it with prohibited switching patterns SMx and/or permitted switching patterns SM0. Advantageously, the monitoring unit 4 further compares transitions from (permitted) switching patterns SM0 to prohibited and/or permitted transitions. If the monitoring unit 4 (directly by comparison with the number of prohibited switching patterns SMx or indirectly by comparison with permitted switching patterns SM0) determines that a switching pattern SM corresponds to a prohibited switching pattern SMx, this switching pattern is blocked by the monitoring unit, i.e. not output to the power switches S1+, S2+, S1−, S2−. If the switching pattern SM corresponds to a permitted switching pattern SM0, the switching pattern is output to power switches S1+, S2+, S1−, S2−.

The invention claimed is:

1. An inverter for converting an input DC voltage applied between a first input pole and a second input pole into at least one output AC voltage, comprising:
   a number of power switches;
   a controller which is configured to output switching patterns for the power switches via control outputs, wherein there exists at least one of a number of permitted transitions or a number of prohibited transitions for each switching pattern of the switching patterns; and
   a monitor comprising monitoring inputs and monitoring outputs, wherein the monitoring inputs are connected to the control outputs in order to receive the switching patterns, and the monitoring outputs are connected to the power switches, and wherein, independently of the controller, the monitor is configured to:
      compare a transition from a first switching pattern of the switching patterns to a second switching pattern of the switching patterns with at least one of the number of prohibited transitions or the number of permitted transitions,
      block the second switching pattern in an event of a match with one of the number of prohibited transitions or in an event of a deviation from the number of permitted transitions, and
      output the second switching pattern to the power switches via the monitoring outputs in an event of a deviation from the number of prohibited transitions or in an event of a match with one of the number of permitted transitions,
   wherein the monitor is configured to output a permitted transition from the first switching pattern to at least one third switching pattern and a permitted transition from the at least one third switching pattern to the second switching pattern in an event of at least one of:
      a match with one of the number of prohibited transitions or
      a deviation from the number of permitted transitions,
   wherein the switching patterns, output from the controller outputs during the transitions, are compared with at least one of a number of permitted switching patterns of the switching patterns or a number of prohibited switching patterns of the switching patterns in order to ensure that the switching patterns output from the controller outputs are permitted, and
   wherein, independently of the controller, the monitor is further configured to:
      compare a received switching pattern of the switching patterns with at least one of the number of prohibited switching patterns or the number of permitted switching patterns,
      block the received switching pattern in an event the received switching pattern matches one of the number of prohibited switching patterns or in an event the received switching pattern deviates from the number of permitted switching patterns, and
      output the received switching pattern to the power switches via the monitoring outputs in an event of a deviation from the number of prohibited switching patterns or in an event of a match with one of the number of permitted switching patterns.

2. The inverter according to claim 1, wherein the number of power switches includes one or more first upper power switches, one or more second upper power switches, one or more first lower power switches, one or more second lower power switches, one or more upper center points and one or more lower center points that are arranged so that each first upper power switch is connected via a respective upper center point to a respective second upper power switch, each first lower power switch is connected via a respective lower center point to a respective second lower power switch,
   wherein the respective upper center points and the respective lower center points are connected to an intermediate circuit center point, and
   wherein an intermediate circuit, which is arranged between the first input pole and the second input pole, comprises a first intermediate circuit capacitor and a second intermediate circuit capacitor that are connected via the intermediate circuit center point.

3. The inverter according to claim 2, wherein the monitor is configured to compare the switching patterns with at least one of the following prohibited switching patterns:
   the first upper power switch closed and the second upper, the first lower and the second lower power switches open,
   the second lower power switch closed and the first lower, the first upper and the second upper power switches open, the first upper and the second lower power switches closed and the second upper and the first lower power switches open, the first upper and the first lower power switches closed and the second upper and the second lower power switches open, the second upper and the second lower power switches closed and the first upper and the first lower power switches open, three power switches of the number of power switches closed, or all power switches of the number of power switches closed.

4. The inverter according to claim 1, wherein the monitor is configured as an field programmable gate array (FPGA).

5. The inverter according to claim 1, wherein the monitor is configured to ensure, in the event of the transition from the first switching pattern to the second switching pattern, that the second switching pattern is only output to the power switches after a safety time has elapsed.

6. The inverter according to claim 1, wherein the monitor is configured to output a permitted switching pattern of the number of permitted switching patterns in the event that the received switching pattern at least one of: matches one of the number of prohibited switching patterns or deviates from the number of permitted switching patterns.

7. A method for operating an inverter that includes a number of power switches, a controller outputting switching patterns for the power switches in order to convert an input DC voltage into at least one output AC voltage, and a monitor operable independently of the controller, wherein there exists at least one of a number of permitted transitions or a number of prohibited transitions for each switching pattern of the switching patterns, the method comprising:

comparing, via the monitor and independent of the controller, a transition from a first switching pattern of the switching patterns to a second switching pattern of the switching patterns with at least one of the number of prohibited transitions or the number of permitted transitions blocking, via the monitor and independent of the controller, the second switching pattern in an event the transition matches one of the number of prohibited transitions or in an event of a deviation from the number of permitted transitions, and outputting, via the monitor and independent of the controller, the second switching pattern to the power switches in an event the transition deviates from the number of prohibited transitions or in an event of a match with one of the number of permitted transitions, wherein the monitor is configured to output a permitted transition from the first switching pattern to at least one third switching pattern and a permitted transition from the at least one third switching pattern to the second switching pattern in an event of at least one of:

the transition matches one of the number of prohibited transitions or a deviation from the number of permitted transitions, wherein the switching patterns, output from the controller during the transitions, are compared with at least one of a number of permitted switching patterns of the switching patterns or a number of prohibited switching patterns of the switching patterns in order to ensure that the switching patterns output from the controller are permitted, and wherein, independently of the controller, the monitor is further configured for:

comparing a received switching pattern of the switching patterns with the at least one of the number of prohibited switching patterns or the number of permitted switching patterns, blocking the received switching pattern in an event the received switching pattern matches one of the number of prohibited switching patterns or deviates from the number of permitted switching patterns, and outputting the received switching pattern to the power switches in an event the received switching pattern deviates from the number of prohibited switching patterns or in an event of a match with one of the number of permitted switching patterns.

8. The method according to claim 7, wherein an action is triggered in the event that the transition matches one of the number of prohibited transitions or in the event of a deviation from the number of permitted transitions.

9. The method according to claim 7, wherein, during the transition from the first switching pattern to the second switching pattern, the monitor ensures that the second switching pattern is only output to the power switches after a safety time has elapsed.

10. The method according to claim 7, wherein the monitor outputs a permitted switching pattern of the number of switching patterns in the event that the received switching pattern at least one of: matches one of the number of prohibited switching patterns or deviates from the number of permitted switching patterns.

11. The method according to claim 7, wherein an action is triggered in the event that the received switching pattern at least one of: matches a prohibited switching pattern of the number of prohibited switching patterns or deviates from the number of permitted switching patterns.

* * * * *